(12) United States Patent
Diard et al.

(10) Patent No.: US 7,796,135 B1
(45) Date of Patent: *Sep. 14, 2010

(54) COHERENCE OF DISPLAYED IMAGES FOR SPLIT-FRAME RENDERING IN MULTI-PROCESSOR GRAPHICS SYSTEM

(75) Inventors: Franck R. Diard, Mountain View, CA (US); Johnson Philip Browning, Campbell, CA (US); Wayne Douglas Young, Milpitas, CA (US); Herbert O. Ledebohm, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/424,552

(22) Filed: Apr. 16, 2009

Related U.S. Application Data (63) Continuation of application No. 11/015,600, filed on Dec. 16, 2004, now Pat. No. 7,522,167.

(51) Int. Cl.
  *G06F 15/16* (2006.01)
  *G09G 5/36* (2006.01)
(52) U.S. Cl. ........................ 345/502; 345/545
(58) Field of Classification Search ................ 345/539, 345/502, 545, 532
  See application file for complete search history.

(56) References Cited

U.S. PATENT DOCUMENTS

| | | | |
|---|---|---|---|
| 4,967,392 A | 10/1990 | Werner et al. | |
| 5,293,480 A | 3/1994 | Miller et al. | |
| 5,450,550 A | 9/1995 | Ito et al. | |
| 5,790,130 A | 8/1998 | Gannett | |
| 5,808,629 A | 9/1998 | Nally et al. | |
| 5,841,444 A | 11/1998 | Mun et al. | |
| 5,956,046 A | 9/1999 | Kehlet et al. | |
| 6,023,281 A | 2/2000 | Grigor et al. | |
| 6,046,709 A * | 4/2000 | Shelton et al. | 345/1.1 |
| 6,078,339 A | 6/2000 | Meinerth et al. | |
| 6,191,800 B1 | 2/2001 | Arenburg et al. | |

(Continued)

FOREIGN PATENT DOCUMENTS

EP 0571969 5/1993

(Continued)

OTHER PUBLICATIONS

Computer Graphics, 26, 2, Jul. 1992 "PixelFlow: High-Speed Rendering using Image Composition", by Steven Molnar et al. pp. 231-240.

(Continued)

*Primary Examiner*—Ryan R Yang
(74) *Attorney, Agent, or Firm*—Townsend and Townsend and Crew LLP (57) ABSTRACT

Coherence of displayed images is provided for a graphics processing systems having multiple processors operating to render different portions of a current image in parallel. As each processor completes rendering of its portion of the current image, it generates a local ready event, then pauses its rendering operations. A synchronizing agent detects the local ready event and generates a global ready event after all of the graphics processors have generated local ready events. The global ready signal is transmitted to each graphics processor, which responds by resuming its rendering activity.

17 Claims, 5 Drawing Sheets

U.S. PATENT DOCUMENTS

| | | |
|---|---|---|
| 6,259,461 B1 | 7/2001 | Brown |
| 6,266,072 B1 | 7/2001 | Koga et al. |
| 6,317,133 B1 | 11/2001 | Root et al. |
| 6,362,818 B1 | 3/2002 | Gardiner et al. |
| 6,445,391 B1 | 9/2002 | Sowizral et al. |
| 6,469,746 B1 | 10/2002 | Maida |
| 6,473,086 B1 | 10/2002 | Morein et al. |
| 6,570,571 B1 | 5/2003 | Morzumi |
| 6,636,224 B1 | 10/2003 | Blythe et al. |
| 6,724,390 B1 | 4/2004 | Dragony et al. |
| 6,747,654 B1 | 6/2004 | Laksono et al. |
| 6,781,590 B2 | 8/2004 | Katsura et al. |
| 6,791,553 B1 | 9/2004 | Lefebvre et al. |
| 6,882,346 B1 | 4/2005 | Lefebvre et al. |
| 6,924,807 B2 * | 8/2005 | Ebihara et al. ............... 345/503 |
| 6,952,217 B1 | 10/2005 | Diard et al. |
| 6,956,579 B1 | 10/2005 | Diard et al. |
| 7,015,915 B1 | 3/2006 | Diard |
| 7,075,541 B2 | 7/2006 | Diard |
| 7,095,416 B1 | 8/2006 | Johns et al. |
| 7,333,114 B2 | 2/2008 | Andrews et al. |
| 7,522,167 B1 | 4/2009 | Diard et al. |
| 2003/0128216 A1 | 7/2003 | Walls et al. |
| 2004/0008200 A1 | 1/2004 | Naegle et al. |
| 2004/0075623 A1 | 4/2004 | Hartman |
| 2005/0012749 A1 | 1/2005 | Gonzalez |
| 2005/0088445 A1 | 4/2005 | Gonzalez |
| 2005/0190190 A1 | 9/2005 | Diard et al. |
| 2006/0055701 A1 | 3/2006 | Taylor et al. |
| 2006/0267993 A1 | 11/2006 | Hunkins et al. |

OTHER PUBLICATIONS

Whitman, "Dynamic Load Balancing for Parallel Polygon Rendering" IEEE Computer Graphics and Applications, IEEE Inc. New York, U.S. vol. 14, No. 4, pp. 41-48, Jul. 1, 1994.

Graphic Remedy, gDebugger Screen shots, http://www.gremedy.com/screenshots.php, Jul. 23, 2004, p. 1-4.

Justice, Brent, "Nvidia SLI Upgrade Guide", Dec. 13, 2004, http://www.HardOCP.com, p. 1-4.

Molnar, Steven et al.; "PixelFlow: High-Speed Rendering Using Image Composition"; 1992, Computer Graphics, vol. 26, No. 2, pp. 231-240.

* cited by examiner

COHERENCE OF DISPLAYED IMAGES FOR SPLIT-FRAME RENDERING IN MULTI-PROCESSOR GRAPHICS SYSTEM

CROSS-REFERENCES TO RELATED APPLICATIONS

This application is a continuation of U.S. patent application Ser. No. 11/015,600, filed Dec. 16, 2004, entitled "Coherence of Displayed Images for Split-Frame Rendering in Multi-Processor Graphics System," by Diard et al., which is incorporated by reference.

The present disclosure is related to the following commonly-assigned co-pending U.S. patent applications:

Application Ser. No. 10/639,893, filed Aug. 12, 2003, entitled "Programming Multiple Chips from a Command Buffer;"

Application Ser. No. 10/642,905, filed Aug. 18, 2003, entitled "Adaptive Load Balancing in a Multi-Processor Graphics Processing System;"

Application Ser. No. 10/726,351, filed Dec. 2, 2003, entitled "Interrupt Servicing for a Multiprocessor Subsystem";

Application Ser. No. 10/789,248, filed Feb. 27, 2004, entitled "Graphics Device Clustering with PCI-Express;"

Application Ser. No. 10/990,712, filed Nov. 17, 2004, entitled "Connecting Graphics Adapters for Scalable Performance"; and Application Ser. No. 11/012,394, filed Dec. 15, 2004, entitled "Broadcast Aperture Remapping for Multiple Graphics Adapters."

The respective disclosures of these applications are incorporated herein by reference for all purposes.

BACKGROUND OF THE INVENTION

The present invention relates generally to graphics processing subsystems with multiple processors and in particular to coherence of displayed images for split frame rendering in a multiprocessor graphics system.

Graphics processing subsystems are designed to render realistic animated images in real time, e.g., at 30 or more frames per second. These subsystems are most often implemented on expansion cards that can be inserted into appropriately configured slots on a motherboard of a computer system and generally include one or more dedicated graphics processing units (GPUs) and dedicated graphics memory. The typical GPU is a highly complex integrated circuit device optimized to perform graphics computations (e.g., matrix transformations, scan-conversion and/or other rasterization techniques, texture blending, etc.), write the resulting pixels to the graphics memory, and deliver the pixels in real time to a display device. The GPU is a co-processor that operates in response to commands received from a driver program executing on a different processor, generally the central processing unit (CPU) of the system.

To meet the demands for realism and speed, some GPUs include more transistors than typical CPUs. In addition, graphics memories have become quite large in order to improve speed by reducing traffic on the system bus; some graphics cards now include as much as 256 MB of memory. But despite these advances, a demand for even greater realism and faster rendering persists.

As one approach to meeting this demand, some manufacturers have begun to develop "multi-chip" (or multi-processor) graphics processing subsystems in which two or more GPUs, usually on the same card, operate in parallel. Parallel operation substantially increases the number of rendering operations that can be carried out per second without requiring significant advances in GPU design. To minimize resource conflicts between the GPUs, each GPU is generally provided with its own dedicated memory area, including a display buffer to which the GPU writes pixel data it renders.

In a multi-chip system, the processing burden may be divided among the GPUs in various ways. For example, in a "split frame rendering" mode, (also referred to herein as "spatial parallelism"), each GPU is instructed to render pixel data for a different portion of the displayable image, such as a number of lines of a raster-based display. The image is displayed by scanning out the pixel data from each GPU's display buffer in an appropriate sequence. As a more concrete example, a graphics processing subsystem may use two GPUs to generate a displayable image consisting of M rows of pixel data; the first GPU can be instructed to render rows 1 through P, while the second GPU is instructed to render rows P+1 through M. In some multi-processor systems, the value of P can be dynamically modified to balance the load.

Multi-chip graphics systems present a variety of problems, among which is "frame coherence." In a single-processor system, the GPU typically has a rendering module that generates image data and a scanout module that reads out pixels of the most recently rendered image to a display device. The pixel buffer is double-buffered, with "front" and "back" frame buffers that each provide storage for a complete image. The scanout module reads pixels for the current image from the front frame buffer while the rendering module writes pixels for the new image to the back frame buffer. Once rendering of the new image is complete, the rendering module notifies the scanout module, and at the next appropriate opportunity (e.g., at the end scanout of a complete frame), the buffers are flipped so that the back frame buffer becomes the front frame buffer and is scanned out while the former front frame buffer becomes the back frame buffer and receives data for a subsequent image.

In a multi-processor system implementing split-frame rendering, it is not guaranteed that all of the GPUs will finish rendering their portions of the new image at the same time. If each GPU simply executes a buffer flip whenever it finishes its portion of the image, different portions of the displayed images will tend to become unsynchronized, leading to tearing and other visual artifacts.

One solution is to attempt to dynamically balance the load, e.g., by modifying the value of P as noted above, so that the GPUs will finish at approximately the same time. However, it is difficult to maintain perfect balance where the image complexity is not static, as is usually the case for animated images.

Therefore, techniques for ensuring coherence of displayed images among multiple GPUs performing split-frame rendering in the presence of load imbalances would be desirable.

BRIEF SUMMARY OF THE INVENTION

Embodiments of the present invention provide systems and methods for coherent image display for a graphics processing systems having multiple processors operating in a split-frame rendering mode. The processors render different portions of a current image in parallel, writing pixel data to respective first frame buffers, while scanning out pixel data for a previous image from respective second frame buffers. As each processor completes rendering of its portion of the current image, it generates a local ready event (or signal), then pauses rendering operations. A synchronizing agent detects the local ready event and generates a global ready event (or signal) after all of the graphics processors have generated their local ready events. The global ready signal is transmitted to each graphics processor, which responds by resuming its rendering activity. The global ready event advantageously serves to trigger a "buffer flip" for all of the graphics processors; after the buffer flip, the pixel data is written to the second buffer while pixel data is scanned out from the first buffer or a different buffer.

According to one aspect of the present invention, a method for rendering images in a graphics processor in synchronization with one or more other graphics processors is provided. A first group of rendering commands is executed, with execution of the first group of rendering commands including writing pixel data for a portion of a current image to a first frame buffer. Concurrently with the act of executing the first group of rendering commands, pixel data for a portion of a previous image is scanned out from a second frame buffer. After executing the first group of rendering commands, a local ready signal is generated. Subsequently to generating the local ready signal, a global ready signal is detected; the global ready signal indicates that each of the one or more other graphics processors has also generated a respective local ready signal. In response to the global ready signal, a second group of rendering commands is executed, with execution of the second group of rendering commands including writing pixel data for a next image to the second frame buffer. In some embodiments, concurrently with the act of executing the second set of rendering commands, the pixel data for the first image may be scanned out from the first frame buffer.

According to another aspect of the present invention, a method is provided for synchronizing buffer transitions among a number of graphics processors, the graphics processors being operable in parallel to write pixel data for a portion of a current image to respective first frame buffers while scanning out a portion of a previous image from respective second frame buffers. A respective local ready signal is received from each of the graphics processors, each local ready signal indicating completion of writing of the pixel data for the portion of the current image associated with the respective one of the graphics processors. After receiving the respective local ready signals from all of the graphics processors, a global ready signal is transmitted to each of the graphics processors; in response to the global ready signal, each of the graphics processors begins to write pixel data for a respective portion of a next image to the respective second frame buffer.

According to yet another aspect of the present invention, a method is provided for operating a graphics processing subsystem including a number of graphics processors, each graphics processor having a first frame buffer and a second frame buffer. A first group of rendering commands is executed in each of the graphics processors; executing the first group of rendering commands includes writing pixel data for a respective portion of a current image to the respective first frame buffer. Concurrently with executing the first group of rendering commands, pixel data for a previous image is scanned out from the second frame buffers of the graphics processors. A local ready signal is generated in each graphics processor after that graphics processor completes execution of the first group of rendering commands. The local ready signal from each of the graphics processors is detected. After detecting the respective local ready signals from all of the graphics processors, a second group of rendering commands is executed in each of the graphics processors, wherein executing the second group pf rendering commands includes writing pixel data for a respective portion of a next image to the respective second frame buffer.

According to a further aspect of the present invention, a graphics processing system includes at least two graphics processors and an interrupt servicing module. The graphics processors, which are configured to render different portions of an image in parallel, each have a first frame buffer and a second frame buffer and a rendering module. The rendering module is configured to execute a stream of commands, including: a first group of rendering commands instructing the graphics processor to write pixel data for a portion of a current image to the first frame buffer; a second group of rendering commands instructing the graphics processor to write pixel data for a portion of a next image to the second frame buffer; an interrupt command instructing the graphics processor to generate a flip interrupt, with the interrupt command occurs in the stream after the first group of rendering commands and before the second group of rendering commands; and a hold command instructing the graphics processor to pause execution of further commands until a global ready signal is received, with the hold command occurring in the stream after the interrupt command and before the second group of rendering commands. The interrupt servicing module is communicably coupled to the graphics processors and is configured to detect flip interrupts from each of the graphics processors and to generate the global ready signal after all of the graphics processors have generated their respective flip interrupts.

In some embodiments, each graphics processor also has a scanout module configured to scan out a portion of a previous image from the second frame buffer in parallel with execution of the first group of rendering commands by the rendering module, and the respective scanout modules of all of the graphics processors are further configured to operate in synchronization with each other to provide a frame to a display device. The interrupt servicing module may be further configured to generate the global ready signal after all of the graphics processors have generated their respective flip interrupts and after the scanout modules have provided a complete frame to the display device.

According to a still further aspect of the present invention, a graphics processing system includes a number of graphics processors and a global control circuit. The graphics processors, which are configured to render different portions of a current image in parallel, each include a first frame buffer and a second frame buffer, a rendering module, and a communication module. The rendering module is configured to execute a stream of commands, including a first group of rendering commands instructing the graphics processor to write pixel data for a portion of the current image to the first frame buffer, and is further configured to assert a local ready signal when execution of the first group of rendering commands is complete. The communication module of each graphics processor is coupled to receive the local ready signal and is configured to propagate the local ready signal to the other graphics processors and to pause execution of the stream of rendering commands after the local ready signal is asserted until a global ready signal is asserted. The global control circuit is coupled to the respective communication modules of each of the graphics processors and is configured to assert the global ready signal in response to propagation of the local ready signal by all of the communication modules.

In some embodiments, the global control circuit includes a global signal line coupled to a logic high level at a node, and each of the communication modules includes a switch operable to couple the global signal line to a logic low level in response to de-assertion of the local ready signal and to decouple the global signal line from the logic low level in response to assertion of the local ready signal. Each of the communication modules may further include a test circuit configured to detect the state of the global ready signal and to pause operation of the rendering module while the local ready signal is asserted and the global ready signal is at the logic low level.

In some embodiments, each of the graphics processors also includes a scanout module configured to scan out a portion of a previous image from the second frame buffer in parallel with execution of the first group of rendering commands by the rendering module, and the respective scanout modules of all of the graphics processors are further configured to operate in synchronization with each other to provide a frame to a display device. Each of the communication modules may be further configured to pause execution of the stream of rendering commands after the local ready signal is asserted until a global ready signal is asserted and the scanout modules have provided a complete frame to the display device.

The following detailed description together with the accompanying drawings will provide a better understanding of the nature and advantages of the present invention.

DETAILED DESCRIPTION OF THE INVENTION

Embodiments of the present invention provide systems and methods for coherent image display for a graphics processing systems having multiple processors operating in a split-frame rendering mode. As used herein "coherent image display" refers to updating portions of the displayed image that are rendered by different graphics processors in such a way that the portions form a consistent, coherent whole. For example, in a raster-based display device, all portions of the image would be updated during the same raster scan.

In split-frame rendering mode, the processors render different portions of a current image in parallel, writing pixel data to respective first frame buffers, while scanning out pixel data for a previous image from respective second frame buffers. As each processor completes rendering of its portion of the current image, it generates a local ready event (or signal), then pauses rendering operations. A synchronizing agent detects the local ready event and generates a global ready event (or signal) after all of the graphics processors have generated their local ready events. The global ready signal is transmitted to each graphics processor, which responds by resuming its rendering activity. The global ready event advantageously serves to trigger a "buffer flip" for all of the graphics processors; after the buffer flip, the pixel data is written to the second buffer while pixel data is scanned out from the first buffer or a different buffer.

System Overview

Figure 1:
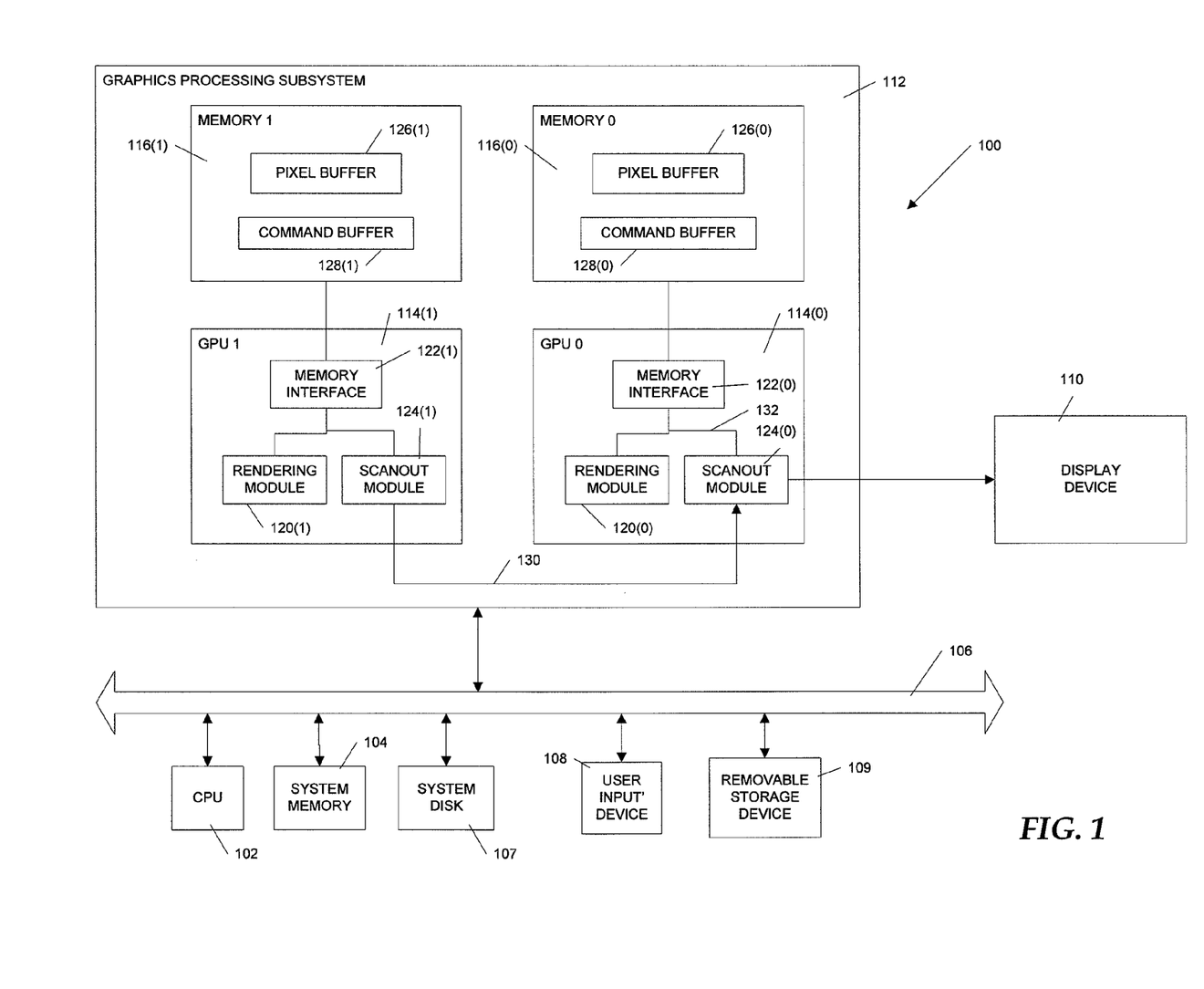
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 107 and other components, such as one or more removable storage devices 109 (e.g., floppy disk drive, compact disk (CD) drive, and/or DVD drive), may also be coupled to system bus 106.

Graphics processing subsystem 112 includes two (or more) graphics processing units (GPUs) 114, each with its own graphics memory 116. (Herein, multiple instances of like objects are identified by the same reference number, with parenthetical instance identifiers where appropriate.) GPUs 114 and memories 116 may be implemented, e.g., using one or more integrated circuit devices such as programmable processors, application specific integrated circuits (ASICs), and memory devices. In one embodiment, graphics processing subsystem 112 is implemented using one or more expansion cards adapted to be connected to an appropriate bus slot (e.g., PCI-E) on a motherboard of system 100.

Each of GPUs 114 includes a rendering module 120, a memory interface module 122, and a scanout module 124. Rendering modules 120 may be configured to perform various tasks related to generating pixel data from graphics data supplied via system bus 106 (e.g., implementing various 2-D and or 3-D rendering algorithms), interacting with respective graphics memories 116 to store and update pixel data, and the like. Rendering modules 120 are advantageously configured to generate pixel data from 2-D or 3-D scene data provided by various programs executing on CPU 102. Rendering modules 120 are advantageously configured identically so that a given rendering instruction can be executed by either of the rendering modules 120(0) or 120(1) with substantially identical results, although this is not required. The particular configuration of rendering modules 120 may be varied as desired, and a detailed description is omitted as not being critical to understanding the present invention.

Memory interface modules 122, which communicate with respective rendering modules 120 and scanout modules 124, manage all interactions with respective graphics memories 116. Each memory interface module 122 may also include pathways for writing pixel data received from system bus 106 to the respective graphics memory 116 without processing by rendering module 120. The particular configuration of memory interface modules 122 may be varied as desired, and a detailed description is omitted as not being critical to understanding the present invention.

Graphics memories 116, which may be implemented using one or more integrated circuit memory devices of generally conventional design, may each contain various physical or logical subdivisions, such as a pixel buffer 126 and a command buffer 128. Each pixel buffer 126 stores pixel data for an image (or for a part of an image) that is read and processed by the respective scanout module 124 and transmitted to display device 110 for display. This pixel data may be generated, e.g., from 2-D or 3-D scene data provided to rendering modules 120 of GPUs 114 via system bus 106 or generated by various processes executing on CPU 102 and provided to one or more of pixel buffers 126 via system bus 106. Pixel buffers 126 are advantageously each double buffered so that while data for a first image is being read for display from a front frame buffer, data for a second image can be written to a back frame buffer without affecting the currently displayed image.

Command buffers 128 are used to queue commands received via system bus 106 for execution by respective rendering modules 120 and/or scanout modules 124, as described below. Other portions of graphics memories 116 may be used to store data required by GPUs 114 (such as texture data, color lookup tables, etc.), executable program code for GPUs 114, and so on.

Scanout modules 124 read pixel color data from pixel buffers 126 and transfer the data to display device 110 to be displayed. In one embodiment, scanout modules 124 operate isochronously, scanning out frames of pixel data at a prescribed refresh rate (e.g., 80 Hz) regardless of any other activity that may be occurring in GPUs 114 or elsewhere in system 100.

In some embodiments, the prescribed refresh rate can be a user selectable parameter, and the scanout order may be varied as appropriate to the display format (e.g., interlaced or progressive scan). Scanout modules 124 may also perform other operations, such as adjusting color values for particular display hardware and/or generating composite screen images by combining the pixel data from pixel buffers 126 with data for a video or cursor overlay image or the like, which may be obtained, e.g., from graphics memory 116, system memory 104, or another data source (not shown). Examples of such scanout operations are known in the art, and a detailed description is omitted as not being critical to understanding the present invention.

Figure 2:
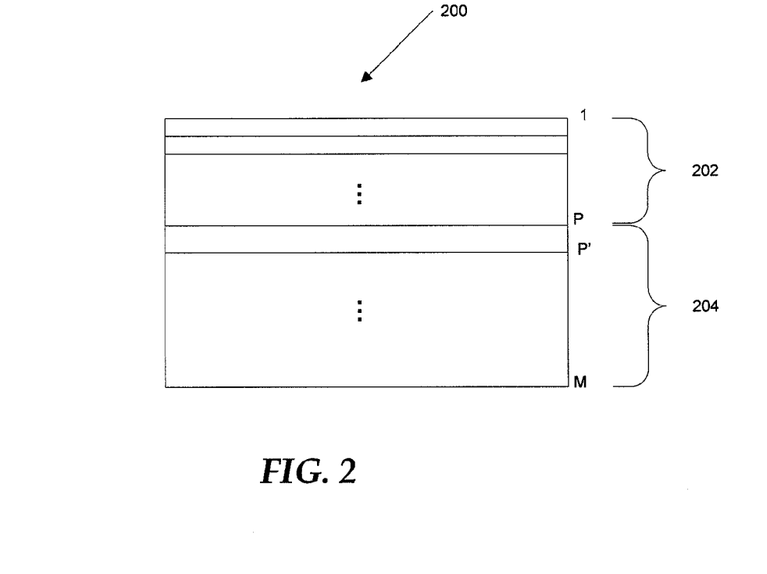
FIG. 2 is an illustration of a display area showing one implementation of spatial parallelism.

In embodiments described herein, multiple GPUs 114 are operated in parallel to render different portions of an image for display device 110; this mode of operation is referred to herein as "spatial parallelism" or "split-frame rendering" ("SFR"). The image portions may correspond to horizontal bands, vertical bands, or other divisions as desired. One example of spatial parallelism is shown in FIG. 2. A display area 200 consists of M lines (horizontal rows) of pixel data. Lines 1 through P (corresponding to top portion 202 of display area 200) are rendered by GPU 114(0) of FIG. 1, while lines P+1 through M (corresponding to bottom portion 204 of display area 200) are rendered by GPU 114(1).

In this embodiment, each GPU 114 allocates a pixel buffer 126 in its local memory 116 that is large enough to store entire frames (M lines) of data but only fills the lines it renders (lines 1 through P for GPU 114(0) and lines P+1 through M for GPU 114(1)). Scanout is performed in a "daisy-chain" fashion, with GPU 114(0) acting as a master and GPU 114(1) acting as a slave. More specifically, slave scanout module 124(1) advantageously operates as if it were delivering pixels directly to display device 110. The pixels, in fact, are provided as "external" candidate pixels to master scanout module 124(0) via a pixel path 130. In parallel, master scanout module 124(0) generates a stream of "internal" candidate pixels via path 132. To select between the two candidate pixels for a given screen location, master scanout module 124(0) advantageously includes a pixel multiplexer (not explicitly shown) driven by a suitable control signal. For example, if GPU 114(0) renders lines 1 through P and GPU 114(1) renders lines P+1 through M, the control signal can be generated such that for pixel locations in lines 1 through P, the internal candidate pixel is chosen while for pixel locations in lines P+1 through M, the external candidate pixel from path 130 is chosen. Examples of such pixel selection techniques are described in above-referenced application Ser. No. 10/789,248 and application Ser. No. 10/990,712. A particular implementation of scanout is not critical to the present invention, and other techniques may be substituted for daisy chaining.

In some embodiments, the value of P can be dynamically adjusted in order to balance the processing load between GPUs 114(0), 114(1). Some examples of dynamic load balancing techniques are described in above-referenced application Ser. No. 10/642,905; other techniques, or no dynamic load balancing, may also be employed. It is to be understood that GPUs 114 may also be operable in other modes, such as an "alternate frame rendering mode" where different ones of GPUs 114 may render different frames in parallel; such modes are not relevant to the present invention.

In this embodiment, communication between components of graphics processing subsystem 112 and other components of system 100 is also managed through a daisy chain. For example, incoming data and commands may be received first by GPU 114(0), e.g., at memory interface 122(0)). Memory interface 122(0) writes data and commands to memory 116(0) and also forwards the data and commands to memory interface 122(1) of GPU 114(1), which handles the data and commands similarly. The data and commands may include broadcast masks (also referred to herein as "sub-device masks") indicating that certain data and/or commands should be ignored by one or another of GPUs 114(0), 114(1). Memory interfaces 122(0) and 122(1) may implement proper processing of any sub-device masks.

During operation of system 100, CPU 102 executes various programs such as operating system programs, application programs, and driver programs for graphics processing subsystem 112. The driver programs may implement conventional application program interfaces (APIs) such as OpenGL, Microsoft DirectX or D3D that enable application and operating system programs to invoke various functions of graphics processing subsystem 112 as is known in the art. Operation of graphics processing subsystem 112 may be made asynchronous with other system operations through the use of command buffers 128 and various interrupts that can be generated by GPUs 114 and serviced by CPU 102.

Command buffers 128(0) and 128(1) queue the commands received via system bus 106 for execution by GPUs 114(0) and 114(1), respectively. More specifically, the driver program executing on CPU 102 delivers a command stream for command buffers 128; the stream may include rendering commands and data for rendering modules 120 as well as state or processing commands for scanout modules 124. In some embodiments, command buffers 128 may each include logically or physically separate sections for commands directed to respective rendering modules 120 and commands directed to respective scanout modules 124. In other embodiments, rendering and scanout commands may be intermixed in command buffers 128 and directed to the appropriate pipeline by suitable control circuitry within GPUs 114.

Each of command buffers 128 is advantageously implemented as a first in, first out buffer (FIFO) that is written by CPU 102 and read by a respective one of GPUs 114. Reading and writing can occur asynchronously. In one embodiment, CPU 102 periodically writes new commands and data to command buffers 128 at a location determined by a "put" pointer, which CPU 102 increments after each write. Asynchronously with CPU 102 and with each other, GPUs 114 may continuously read and process rendering commands and data sets previously stored in their respective command buffers 128. For instance, GPU 114(0) (114(1)) may maintain a "get" pointer to identify the read location in command buffer 128(0) (128(1)), with the get pointer being incremented after each read. Provided that CPU 102 stays sufficiently far ahead of GPUs 114, the GPUs are able to render images without incurring idle time waiting for CPU 102. In some embodiments, depending on the size of the command buffer and the complexity of a scene, CPU 102 may write commands and data sets for frames several frames ahead of a frame being rendered by GPUs 114. Command buffers 128 may be of fixed size (e.g., 5 megabytes each) and may be written and read in a wraparound fashion (e.g., after writing to the last location, CPU 102 may reset the "put" pointer to the first location).

In some embodiments, the command stream delivered by driver program 136 may include sub-device masks that cause selected portions of the stream not to be written to one or another of command buffers 128. Alternatively, all of the command stream may be written to all command buffers 128, and sub-device masks may be operative during command execution, with a suitable mask acting as an instruction to one or more of rendering modules 120 and/or scanout modules 124 to skip execution of certain commands. Thus, command buffers 128(0) and 128(1) could be implemented in a single memory accessible to both of GPUs 114(0) and 114(1). Embodiments of sub-device masks are described in above-referenced application Ser. No. 10/639,8973, and a detailed description is omitted herein as not being critical to understanding the present invention.

In one embodiment of spatial parallelism, sub-device masks can be used to control which portion of the image each GPU renders. For example, a sub-device mask specific to GPU 114(0) may be used to set a clip rectangle corresponding to top portion 202 of frame 200 (FIG. 2), and a sub-device mask specific to GPU 114(0) may be used to set a clip rectangle corresponding to bottom portion 204 of frame 200.

In some embodiments, execution of rendering commands by rendering modules 120 is advantageously asynchronous with operation of scanout modules 124. For example, where pixel buffers 126 are each double buffered as mentioned above, rendering modules 120 can freely overwrite the back frame buffers while scanout modules 124 read from the front frame buffers. Thus, rendering modules 120 may read and process commands as they are received.

At appropriate times, e.g., when rendering of a new image to the back buffers is complete, front and back buffers for both GPUs 114 may be flipped. In accordance with an embodiment of the present invention, flipping of the back and front buffers is advantageously synchronized among GPUs 114 in order to provide coherence in the displayed image, and flipping can be further synchronized with the end of a scanout frame. Specific examples of techniques for synchronizing buffer flips (also referred to herein as "buffer synchronization") in accordance with the present invention are described below.

It will be appreciated that the system described herein is illustrative and that variations and modifications are possible. A GPU may be implemented using any suitable technologies, e.g., as one or more integrated circuit devices, and different GPUs of a multi-processor graphics system might or might not be identical in structure, capabilities, and operation. Any or all of the GPUs or other components may be mounted on an expansion card, mounted directly on a system motherboard, or integrated into a system chipset component (e.g., into the "north bridge" chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout module(s) may be integrated with a GPU or provided on a separate chip and may be implemented, e.g., using one or more ASICs, programmable processor elements, other integrated circuit technologies, or any combination thereof.

Further, while two GPUs, with respective memories, are shown, any number of GPUs can be used, and some or all of the GPUs might share a memory. Memory interfaces, rendering modules and scanout modules for a GPU may be implemented in a single integrated circuit device or in separate integrated circuit devices (chips).

Interconnection between the GPUs may also be modified. For instance, a bridge unit might be provided to interconnect GPUs. A bridge unit, which can be in a separate chip or integrated with one of the GPUs, receives incoming data from system bus 106 and distributes it appropriately (e.g., to all GPUs or to those GPUs identified by a sub-device mask). Another bridge unit might be provided to manage selection among candidate pixels during scanout.

Graphics processing subsystems can be implemented using one or more expansion cards adapted for various bus standards, including PCI, PCI-E, AGP and so on. In one embodiment, all of the GPUs are mounted on one expansion card. In another embodiment, different GPUs are mounted on different interconnected expansion cards. The cards may be interconnected using a system bus (e.g., PCI-E), or a special card-to-card connector may be provided. Examples of interconnections and configurations for multi-processor graphics subsystems are described in above-referenced application Ser. No. 11/012,394 and application Ser. No. 10/990,712. It is to be understood that the present invention may be practiced in any of these configurations or in any other multi-processor configuration suitable for split-frame rendering.

In addition, graphics processing subsystems embodying the present invention may be incorporated into a variety of devices, including general purpose computer systems, video game consoles and other special purpose computer systems, DVD players, handheld devices such as mobile phones or personal digital assistants, and so on.

Buffer Synchronization Overview

In accordance with an embodiment of the present invention, buffer synchronization is implemented for split-frame rendering to ensure that all parts of the displayed image are updated at the same time. Buffer synchronization prevents tearing or other artifacts resulting from portions of two or more different images being on the screen at once.

Buffer synchronization can be implemented using software or hardware or a combination thereof. At a high level, buffer synchronization mechanisms share a common behavior. At the completion of rendering operations for an image, each of the rendering modules 120 generates a "local ready" event indicating that its portion of the image is ready for display, then goes into a waiting state. A synchronizing agent (not explicitly shown in FIG. 1), which may be implemented in hardware or software, detects when the rendering modules 120 of all GPUs 114 have each generated one local ready event and generates a "global ready" event that is detectable by all GPUs 114. In response to detecting the global ready event, all GPUs 114 flip their respective front and back buffers, then proceed with rendering the next frame.

Figure 3:
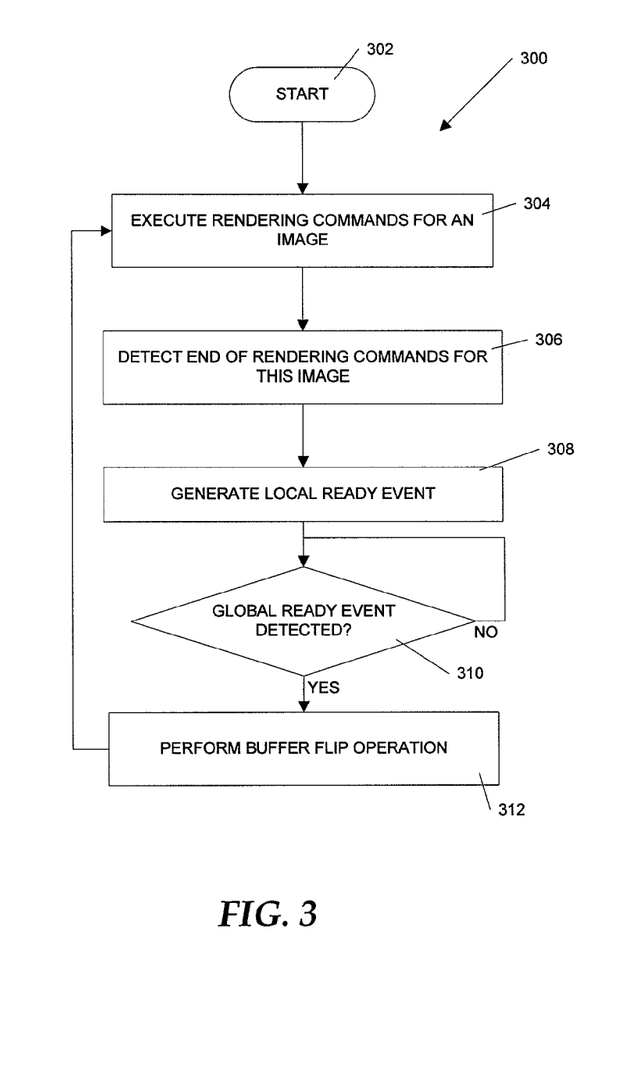
FIG. 3 is a flow diagram of a synchronization process from the perspective of a graphics processing unit (GPU) according to an embodiment of the present invention.
Figure 4:
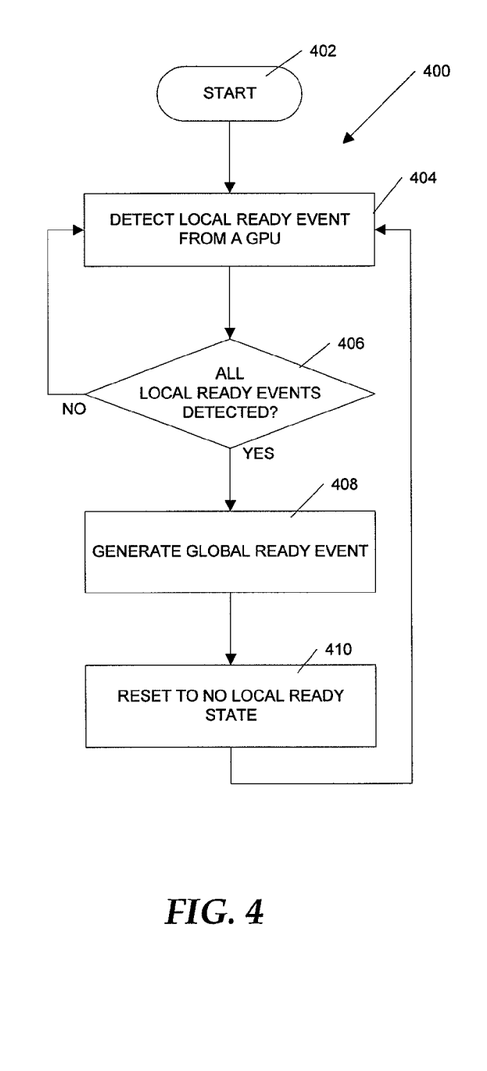
FIG. 4 is a flow diagram of a synchronization process from the perspective of a synchronizing agent according to an embodiment of the present invention.

FIGS. 3 and 4 are flow diagrams illustrating this high-level synchronization process from the perspective of a representative GPU 114 (FIG. 1) and the synchronizing agent, respectively. Turning first to the GPU perspective, process 300 of FIG. 3 begins with system initialization (step 302). One of the two frame buffers in pixel buffer 126 is selected as a back buffer for writing an image and the other as a front buffer for reading (scanning out) an image. At step 304, rendering module 120 executes the rendering commands for a new image from command buffer 128. Execution continues until the end of the rendering commands for the new image is detected (step 306). At that point, rendering module 120 generates its "local ready" event. A local ready event may include any event that is detectable by the synchronizing agent; examples are described below.

After generating its local ready event, rendering module 120 enters a loop (step 310) waiting to detect a global ready event. As described below with reference to FIG. 4, the global ready event is generated by the synchronizing agent when all GPUs have generated local ready events. During step 310, rendering module 120 is advantageously paused, i.e., not executing commands from command buffer 128. Scanout module 124 continues to operate isochronously and may scan out the same front buffer any number of times while rendering module 120 continues to wait for the global ready event.

Eventually, the global ready event is detected, and process 300 continues. At step 312, the front and back buffers for GPU 114 are flipped (e.g., the previous back buffer becomes the front buffer and vice versa); this can be done by swapping front and back base pointers or using other techniques known in the art. Thereafter, process 300 returns to step 304 for execution of rendering commands for the next new image; scanout module 124 scans out the previous "new" image during this time.

It is to be understood that process 300 is advantageously implemented in each GPU 114, and in preferred embodiments, the buffer flipping (step 312) occurs substantially simultaneously in all GPUs. For example, if assertion of the global ready signal is synchronized with processing of the last pixel of a frame by the scanout modules, each GPU advantageously completes the buffer flip before its scanout module begins to process the first pixel of the next frame.

Turning now to the synchronizing agent, process 400 of FIG. 4 begins with system initialization (step 402). During initialization, the synchronizing agent enters a state which none of the local ready events has been detected, and the global ready event has not occurred. At step 404, the synchronizing agent detects a local ready event in one (or more) of the GPUs. The synchronizing agent advantageously forms a temporary record of local ready events that have been detected; in some embodiments, this temporary record reflects the number of GPUs that have generated local ready events and might or might not associate detected local ready events with specific GPUs. At step 406, it is determined, based on the temporary record, whether local ready events have been detected in all GPUs. If not, process 400 returns to step 404 to wait for local ready events from other GPUs.

Once all local ready events have been detected, at step 408 the synchronizing agent generates a global ready event. This event may be any event that can be detected in all of the GPUs and used to trigger resumed execution of rendering commands; examples are described below. At step 410, process 400 resets to the state in which no local ready events have been detected (e.g., the temporary record may be erased or reset) and the global event is cleared. The reset is advantageously completed before any of the GPUs would generate another local ready event.

It will be appreciated that processes 300 and 400 are illustrative and that variations and modifications are possible. Steps described as sequential may be executed in parallel, order of steps may be varied, and steps may be modified or combined. The synchronization agent may be implemented in any combination of hardware and/or software components; these components may be internal or external to the GPUs and will generally include at least one communication path between the GPUs.

Examples of specific implementations of high-level processes 300 and 400 will now be described. In one embodiment, the synchronizing agent is implemented in the CPU. In another embodiment, the synchronizing agent is implemented or within the graphics processing subsystem.

CPU-Based Synchronizing Agent

In some embodiments, the synchronizing agent is implemented in CPU 102 (FIG. 1), e.g., using interrupt handlers. As is known in the art, GPUs 114 (and other components of system 100) can generate interrupts, which are special signals sent to CPU 102 to trigger some predetermined processing activity therein. The processing activity is generally defined by a deferred procedure call (DPC) that is specific to a particular component; for instance, there is typically a "graphics DPC" that handles interrupts generated by graphics subsystem 112. A GPU 114, like other components, can be configured to generate interrupts for multiple different reasons (e.g., at the end of rendering an image or at the end of scanning out a frame); status registers in each GPU 114 can be used to store values indicating the reason for the interrupt. The graphics DPC is advantageously configured to read the status registers of GPUs 114 to determine the reason for the interrupt and respond accordingly. Whenever an interrupt is generated, CPU 102 services the interrupt by executing an interrupt servicing routine (ISR) at a maximum priority level, suspending other operations as needed. The ISR generally schedules the DPC for execution, then releases the interrupt and exits, allowing CPU 102 to resume other activity. The process on GPU 114 that generated the interrupt is generally suspended in an interrupt state until the DPC executes; accordingly, DPCs are typically scheduled by CPU 102 for high priority. Conventional techniques for generating interrupts and scheduling execution of DPCs may be employed.

In system 100, which includes multiple GPUs 114, it is possible for one GPU 114 to generate an interrupt while the graphics DPC is executing on CPU 102. In some embodiments, the graphics DPC may mask off all GPU interrupts during its execution and may service all pending interrupts in all GPUs 114 while it is active, as described in above-referenced application Ser. No. 10/726,351.

In one embodiment of the present invention, the rendering command stream includes a command that causes each GPU 114 to send a "flip" interrupt to CPU 102 at the end of rendering an image, and the portion of the graphics DPC that handles flip interrupts (referred to herein as a "flip interrupt handler" or "FIH") is configured to recognize the flip interrupt as a local ready event. The rendering command stream further includes one or more additional commands that cause the rendering module to wait until CPU 102 detects flip interrupts from all GPUs and thereupon signals the global ready event to the GPUs.

Figure 5:
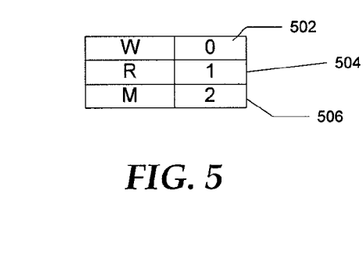
FIG. 5 is an illustration of buffer-usage registers for a GPU.

In one embodiment, the global ready event is signaled to the GPUs 114 using buffer allocation registers. As shown in FIG. 5, each GPU 114 has a set of registers 500 that are used to indicate the current allocation of the individual frame buffers within pixel buffer 126. Each buffer is identified by an index value (0, 1, etc.). Write register 502 stores a write value w (e.g., 0) indicating which buffer is being written, and read register 504 stores a read value r (e.g., 1) indicating which buffer is being read (scanned out). Writing to the back buffer is advantageously blocked in the event that the same value is stored in write register 502 and read register 504. Modulo (MOD) register 506 stores a modulo value m indicating the number of buffers available. For example, m=2 corresponds to double-buffering, but those skilled in the art will recognize that triple buffering or other configurations may also be employed if desired and that modulo value m may be set accordingly. In some embodiments, modulo value m is a configurable parameter of the graphics system. Registers 500 for a given GPU 114 are advantageously write-accessible to that GPU 114 and also to CPU 102.

Figure 6:
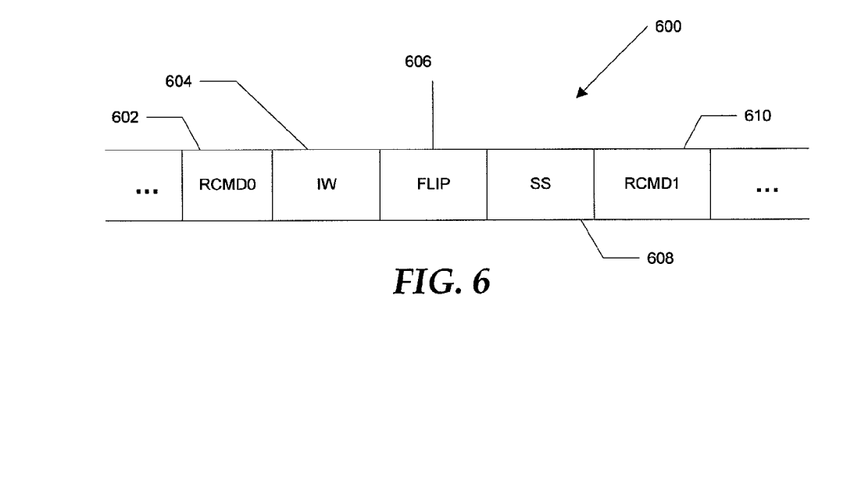
FIG. 6 illustrates a portion of a rendering command stream for a GPU.

FIG. 6 illustrates a portion of a rendering command stream 600 that may be written to each command buffer 126 for execution by a respective rendering engine 120. RCMD0 (block 602) and RCMD1 (block 610) represent rendering commands for rendering a first frame and a second frame, respectively; such commands may be conventional in nature. Between RCMD0 and RCMD1 is a transitional command sequence: IW (block 604), FLIP (block 606), SS (block 608). Execution of this transitional command sequence generates a local ready event following completion of the first frame and then causes rendering engine 120 to wait for a global ready event before beginning the second frame.

More specifically, the IW (for "increment write") command increments the write value w in write register 502, modulo the value m in modulo register 506. For instance, in response to the IW command, rendering module 124(0) may execute w=(w+1) mod m; this may be a hardware-implemented operation. Execution of the IW command advantageously results in the write value w becoming equal to the read value r.

Execution of the FLIP command generates a flip interrupt in GPU 114 that is detected and handled by CPU 102 as described above (e.g., by executing a graphics DPC that includes an FIH component). The same FIH is advantageously used, regardless of which GPU 114 generated a particular flip interrupt, and the FIH advantageously does not include waiting for flip interrupts from other GPUs. An example of a suitable FIH is described below.

Upon completion of the FIH, the GPU 114 is released from its flip-interrupt state. Rendering module 120 then executes the SS (for "sync stall") command. This command instructs rendering module 120 to compare the respective values stored in the write register 502 and read register 504 of its GPU 114. If the values are equal, rendering engine 120 waits a preset time (which may be zero or more clock cycles), then compares the values again. Eventually, CPU 102 increments the read value r in read register 504 so that it is no longer equal to the write value in write register 502, as described below. Once the read and write values become unequal, the sync stall ends and rendering engine 120 proceeds to execute RCMD1 (block 610).

In one embodiment, command stream 600 is the same as a conventional command stream for a single-GPU system in which the GPU generates flip interrupts upon completion of each new image and relies on the CPU to perform the buffer flip at an appropriate time, e.g., in synchronization with the end of a scanout frame. The present embodiment, however, differs from conventional single-GPU systems in that buffer flipping is synchronized among multiple GPUs. In particular, the FIH identifies the occurrence of a flip interrupt from a GPU 114 as the local ready event for that GPU. Only after all of the GPUs 114 have generated flip interrupts does the FIH initiate a buffer flip for all GPUs and increment the read value r in read register 504 of each GPU 114, e.g., according to r=(r+1) mod m. Thus, in this embodiment, incrementing read register 504 serves as the global ready event.

Figure 7:
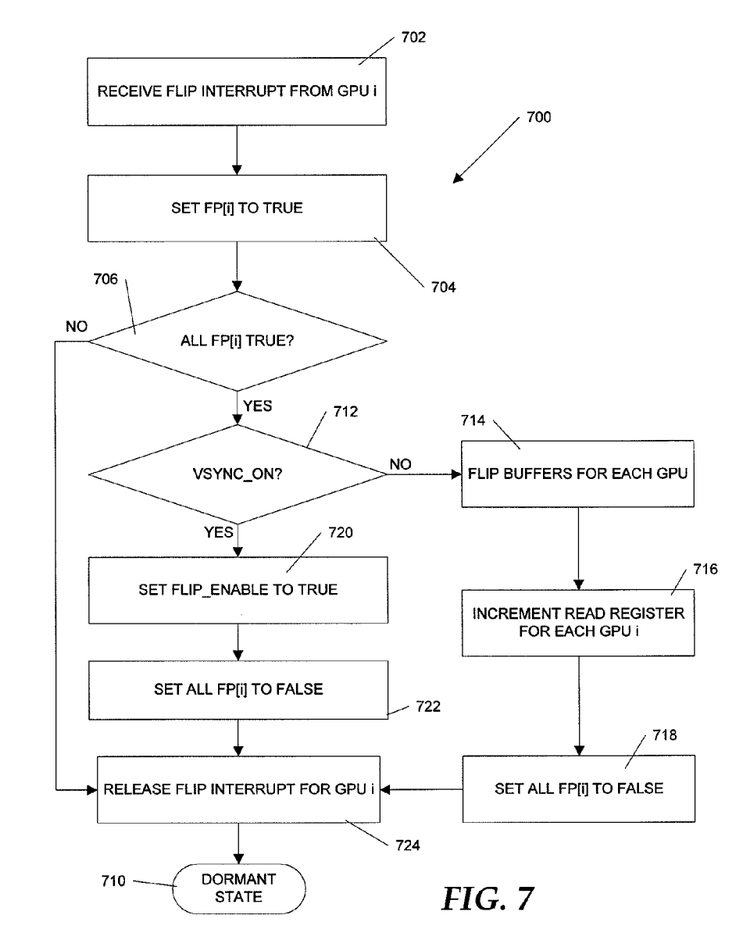
FIG. 7 is a flow diagram of a process implementing a flip interrupt handler according to an embodiment of the present invention.

Referring now to FIG. 7, there is shown a process 700 implementing an FIH according to an embodiment of the present invention. Process 700 advantageously handles flip interrupts from all of the GPUs 114. In process 700, CPU 102 maintains an array of Boolean values FP[i] that provides a record of which GPUs 114(i) have finished the frame. On system initialization, all FP[i] are set to a logical false value (e.g., FP[i]=0). Process 700 also provides an option ("vsync_on") by which the flipping of front and back buffers in the GPUs 114 can further be synchronized with the end of a scanout frame.

At step 702, the FIH is invoked. For instance, the graphics DPC may determine from the GPU status registers that a flip interrupt has been generated in one of GPUs 114 and invoke its FIH component. At step 704, FP[i] for the GPU 114(i) that generated the flip interrupt is set to a logical true value (e.g., FP[i]=1), thereby recording the flip interrupt as the local event for that GPU 114(i). At step 706, it is determined whether FP[i] is true for all of the GPUs 114. This can be done, e.g., by performing a Boolean AND operation over all FP[i] values or by adding the FP[i] values and comparing the sum to the total number of GPUs. If fewer than all FP[i] are true, process 700 releases the flip interrupt (step 708) and enters a dormant state (step 710). In the dormant state, the FP[i] array is persistent, so that previous local ready events will still be in the record the next time process 700 executes. While process 700 is in its dormant state, other components of the graphics DPC may be executed, or the DPC process may be inactive (e.g., swapped out) while other processes execute on CPU 102.

Eventually, each GPU 114 generates one flip interrupt. When all FP[i] are determined to be true at step 704, then at step 712 it is determined whether the vsync_on option is enabled. If not, at step 714, process 700 flips the buffers for all GPUs 114. Buffer flipping can take various forms; in one embodiment, the system maintains a "back" base pointer that is used to identify the area in pixel buffer 126 to which pixels are to be written and a "front" base pointer that is used to identify the area in pixel buffer 126 from which pixels are to be read, and buffer flipping includes switching the back pointer with the front pointer. In one embodiment, all GPUs 114 and graphics memories 116 have sufficiently similar configurations that the same pointer update can be broadcast to all GPUs 114.

At step 716, process 700 signals the GPUs that the flip has occurred by incrementing the read value r in register 504 for each GPU 114. In some embodiments incrementing the read values may be accomplished for all of GPUs 114 in parallel by broadcasting a register update. As described above, incrementing the read value r for a GPU 114 signals rendering engine 120 to end the sync stall and continue processing rendering command stream 600. Thereafter, at step 718, process 700 resets all FP[i] to the logical false value, releases the flip interrupt (step 708), and returns to its dormant state (step 710).

Returning to step 712, if the vsync_on option is enabled, the buffer flip is further synchronized with the end of the next scanout frame (referred to herein as a "vsync" event) after all GPUs have finished the new image (i.e., after all FP[i] become true). If the vsync_on option is enabled, process 700, which does not detect vsync events, does not perform the buffer flip. Instead, if the vsync_on option is enabled at step 712, process 700 sets a Boolean "flip_enable" value to its logical true state (step 720). Thereafter, process 700 resets all FP[i] to logical false (step 722), releases the flip interrupt (step 708), and returns to its dormant state (step 710).

Figure 8:
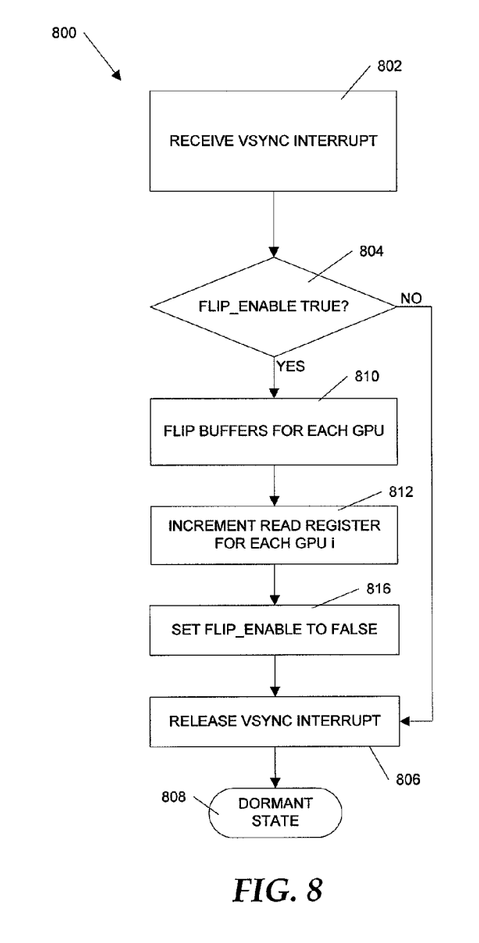
FIG. 8 is a flow diagram of a process implementing a vsync, or end-of-frame, interrupt handler according to an embodiment of the present invention.

The flip_enable value is used by a vsync-interrupt handler ("VIH") that may be included as a separate component of the graphics DPC. Vsync interrupts are advantageously generated by scanout module 124 at the end of each frame. FIG. 8 is a flow diagram of a process 800 implementing a VIH for a graphics DPC according to an embodiment of the present invention.

At step 802, the VIH is invoked. For instance, the graphics DPC may determine from the GPU status registers that a vsync interrupt has been generated in one of GPUs 114 and invoke its VIH component. At step 804, the flip_enable value is tested to determine whether it is true. If not, the GPUs are not ready for a buffer flip on this frame, and process 804 releases the GPU 114 from its vsync interrupt (step 806) and goes into a dormant state (step 808). If flip_enable is true at step 804, then the buffer flip is performed (step 810), and read registers 504 for each GPU 114 are incremented (step 812). Implementation of steps 810 and 812 may be identical to steps 714 and 716 of process 700 described above. At step 816, process 800 resets flip_enable to its logical false state. Thereafter, the GPU 114 is released from its vsync interrupt state (step 806), and process 800 returns to a dormant state (step 808). It is to be understood that in addition to the operations shown in FIG. 8, a VIH may also perform other operations that are to be synchronized or otherwise coordinated with scanout; examples are known in the art, and the presence, absence, or nature of any such operations is not critical to the present inventions.

It will be appreciated that this CPU-based implementation is illustrative and that variations and modifications are possible. Steps described as sequential may be executed in parallel, order of steps may be varied, and steps may be modified or combined. For example, the order of activities within the FIH and/or VIH may be varied. In one alternative embodiment, the FIR maintains a running count of the number of GPUs that have generated flip interrupts. In another variation, updating of the bit pointers may be done within the GPUs. For instance, upon detecting that the values in the read and write registers are no longer equal, the GPU might swap the pointers to match the new read and write register values before proceeding to render the next frame. In other embodiments, mechanisms other than interrupts may be used to alert the CPU to a local ready event.

It should also be noted that processes 700 and 800 can be used to support spatial parallelism with any number of GPUs, including the "degenerate" case of a single GPU. In the single GPU case, each time the GPU generated a flip interrupt, process 700 would determine that all FP[i] were true and would proceed with the flip operation.

Further, use of processes 700 and 800 is not limited to double buffering; similar processes may also be used to support a triple-buffered (or, more generally, an N-fold buffered) pixel buffer. For example, the write value w and read value r may be initialized such that w=(r+1) mod m, and changing of the pointer for the back (write) buffer may be controlled by the GPU, e.g., in response to the FLIP command. Provided that the FIH can monitor occurrences of flip interrupts on a per-frame basis, each GPU could continue to render frames and change rendering buffers on each frame until the IW command results in w=r; at that point, the SS command would cause rendering to pause pending the global ready event.

The read and write registers shown in FIG. 5 may also be modified. In one alternative embodiment, a synchronization control register stores a flag indicating a "stall" or "go" state (e.g., a value of 0 could be stored in the control register to represent the stall state and a value of 1 to represent the go state). The IW command is replaced by a command to set the flag to the stall state, and the FIH and/or VIH are modified to reset the flag to the go state to indicate the global ready event. The SS command is modified to wait until the stall value is replaced by the go value, whereupon the sync stall ends and rendering of the next image begins. Other variations are also possible.

Synchronizing Agent within Graphics Subsystem

In other embodiments, the synchronization agent is implemented within the graphics processing subsystem, e.g., by suitably configuring and interconnecting the GPUs.

Figure 9:
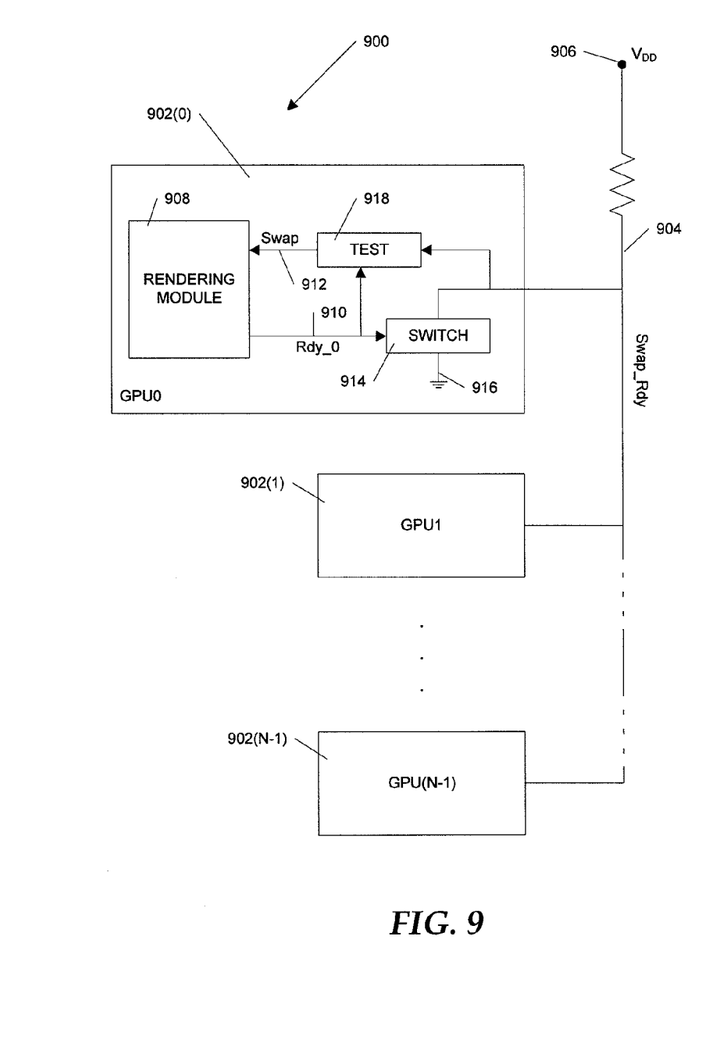
FIG. 9 is a simplified block diagram of a multi-GPU subsystem with hardware-based detection of global ready events according to an embodiment of the present invention.

FIG. 9 is a simplified block diagram of a multi-GPU subsystem 900 according to an embodiment of the present invention. Subsystem 900 includes GPUs 902(0)-902(N-1). Each of GPUs 902 is connected in parallel to a global event path 904, which is connected at one end to a logic high voltage level ($V_{DD}$) at a node 906 via a resistor 905. This connection may be provided, e.g., by including an externally connectable "ready" pin on each GPU 902 and providing global event path 904 on a printed circuit board on which GPUs 902 are mounted.

Control elements for communicating via global event path 904 are shown in detail for GPU 902(0); it is to be understood that each other GPU 902(1)-902(N-1) has corresponding control elements. As shown for GPU 902(0), a rendering module 908 can both send and receive signals via path 904 using a local ready path 910 and a swap path 912. Local ready path 910 carries a signal (Rdy_0) generated by rendering module 908 that opens or closes a switch 914. When switch 914 is closed, global event path 904 is coupled to a ground potential 916, and a signal Swap_Rdy carried on path 904 is pulled down to ground (logic low) regardless of the state of corresponding switches in other GPUs 902. When switch 9 14 is open, the Swap_Rdy signal on path 904 floats. As long as a switch 914 in at least one of GPUs 902 is closed, the Swap_Rdy signal remains at ground; when the switches 914 in all GPUs 902 are open, the Swap_Rdy signal is pulled up to the logic high level by the action of resistor 905 coupled to logic high node 906.

GPU 902(0) senses the logic level of the Swap_Rdy signal using a test circuit 918 that, in one embodiment, also receives the local ready signal from path 910. Based on the state of the Swap_Rdy signal on global event path 904 and the Rdy_0 signal on local ready path 910, test circuit 918 determines whether GPU 902(0) is ready to flip its buffers and generates a Swap signal on swap path 912. In one embodiment, the test circuit implements a logical AND on the Rdy_0 and Swap_Rdy signals; a logic high state of the resulting Swap signal indicates that GPU 902(0) is ready to flip its buffers.

Figure 10:
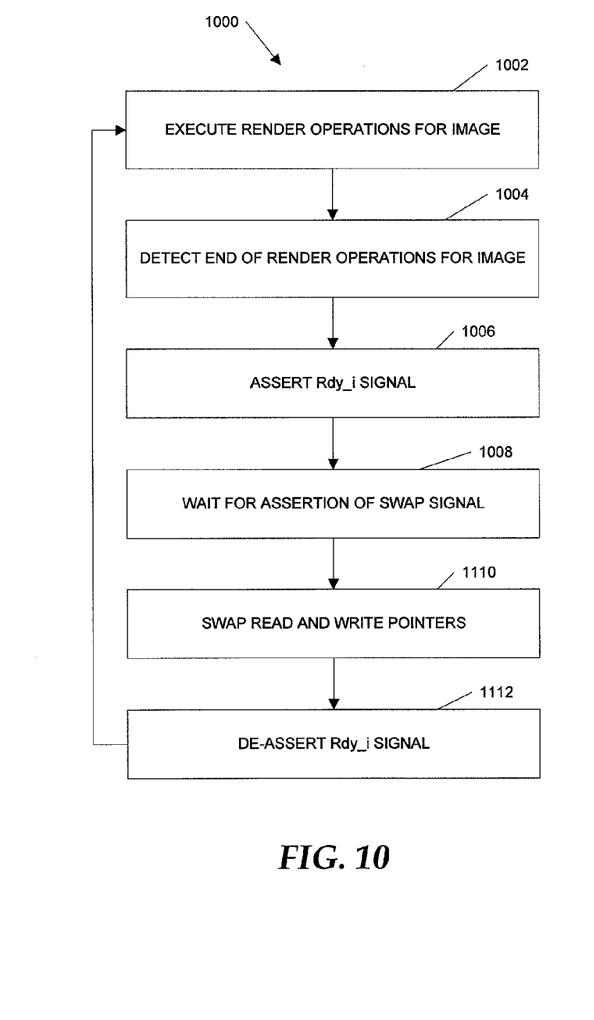
FIG. 10 is a flow diagram illustrating a buffer-flipping operation that can be implemented in the GPUs of FIG. 9.

FIG. 10 is a flow diagram of a process 1000 that can be implemented in each GPU 902 in subsystem 900 for generating and responding to a Swap_Rdy signal. At step 1002, rendering module 908 executes rendering operations for an image. At this stage, the Rdy_0 signal (more generally, Rdy_i for GPU 902(i)) is in its logic low state and switch 914 is closed, pulling the Swap_Rdy signal to logic low. At step 1004, rendering module 908 detects the end of rendering operations for the image. In one embodiment, rendering module 908 recognizes a special command in the rendering command stream that marks the end of an image, e.g., as shown in FIG. 6.

Upon detecting the end of rendering operations, rendering module 908 asserts its Rdy_i signal in the logic high state (step 1006) and waits for assertion of the swap signal on path 912 (step 1008). Assertion of the Rdy_i signal on path 910 opens switch 914 and indicates a local ready event for that GPU 902.

The Swap_Rdy signal on path 904, however, remains at logic low until all of GPUs 902 have opened their respective switches 914, i.e., when all of the GPUs have detected the end of rendering operations for the image. At that point, the Swap_Rdy signal 1 transitions to logic high. This transition of the Swap_Rdy signal acts as the global ready event and is received by all of GPUs 902 at substantially the same time.

Test circuit 918 notifies rendering engine 908 of the global ready event. More specifically, test circuit 918 detects the logic high state of the Swap_Rdy and Rdy_0 signals and responds by asserting the Swap signal. For example, if test circuit 918 includes an AND gate, the AND gate would generate a logic high (asserted) state only when the Rdy_0 and Swap_Rdy signals were both at logic high. In another embodiment, the Swap_Rdy signal might be used as the Swap signal directly, and test circuit 918 may be omitted.

Referring again to FIG. 10, once the Swap signal is asserted, at step 1010 each GPU 902 flips its own back and front buffers, e.g., by updating pointers as described above. In some embodiments, semaphores may be used within each GPU 902 to coordinate the buffer flip between rendering module 908 and the scanout module (not shown in FIG. 9). At step 1012, each GPU 902 de-asserts its Rdy_i signal, closing switch 914 and thereby pulling the Swap_Rdy signal on path 904 down to logic low. Thereafter, GPU 902 returns to step 1002 to render the next image.

It will be appreciated that this implementation is illustrative and that variations and modifications are possible. Different logic circuits may be substituted for the switch and test circuits shown here, voltage levels and polarities corresponding to logic high and logic low states may be varied, and so on. In some embodiments, the test circuit may also receive a vsync or other end-of-frame signal from a scanout module (not shown in FIG. 9) and may use that signal to synchronize the buffer flip with the start of a new frame, e.g., by delaying assertion of the Swap signal until the Swap_Rdy signal is asserted and a vsync signal is received.

In an alternative embodiment, the GPUs may have switches connected in series to the global event path, with separate input and output pins used to make the connection. In this embodiment, the global event path would float when the switch for any one GPU was open and would be pulled to a logic low (or logic high) level only when all GPUs had closed their switches.

It should also be noted that this implementation may be used to implement spatial parallelism with any number of GPUs, including the degenerate case of one GPU. With only one GPU connected to path 904, the Swap_Rdy signal would be asserted as soon as that GPU opened its switch, allowing the buffer flip to proceed with negligible delay.

Further, this implementation is not limited to double buffering; similar techniques may be used to support a triple-buffered (or, more generally, an N-fold buffered) pixel buffer.

Further Embodiments

While the invention has been described with respect to specific embodiments, one skilled in the art will recognize that numerous modifications are possible. For instance, as noted above, any number of GPUs may cooperate to render different portions of an image. Different GPUs may be substantially identical in implementation, processing capacity, and/or connection path to a CPU, or they may be different in any or all of these respects. For example, one GPU may be implemented in a motherboard-mounted chip while another is provided on an expansion card. As another example, one GPU may be more powerful than another; adaptive load balancing (e.g., as described in above-referenced application Ser. No. 10/642,905, may be used to divide the frame such that all GPUs require approximately equal processing time per frame, regardless of differences in processing capacities.

The synchronizing agent, global ready, and local ready signals may be implemented in a variety of ways, not limited to those described specifically herein. Without departing from the scope of the invention, the synchronizing agent may be implemented in any component of a computer system that is able to communicate with the GPUs for the purposes of receiving local ready events and generating a global ready event. For instance, if a bridge chip is used to manage communications among the GPUs, the synchronizing agent may be implemented on the bridge chip.

Further, while the embodiments described herein may refer specifically to double-buffering, it will be appreciated that triple-buffering (or, more generally, N-fold buffering) may be implemented.

Multi-processor graphics systems implementing split-frame rendering can be implemented in a variety of computer systems including general purpose computers (e.g., laptop or desktop PCs), video game consoles, handheld computers, personal digital assistants, and other mobile devices (e.g., phones). Buffer synchronization may be implemented in any of these or other configurations.

Thus, although the invention has been described with respect to specific embodiments, it will be appreciated that the invention is intended to cover all modifications and equivalents within the scope of the following claims.

What is claimed is:

1. A method of synchronizing buffer transitions among a plurality of graphics processors using a central processing unit, the method comprising:

with the central processing unit, transmitting a stream of rendering commands to the plurality of graphics processors, the stream of rendering commands including one or more commands directing each of the graphics processors to write pixel data for a portion of a current image associated with the respective one of the graphics processors to a respective first frame buffer;

with the central processing unit, receiving from each of the graphics processors a first signal, each first signal indicating completion of writing of the pixel data for the portion of the current image associated with the respective one of the graphics processors; and after receiving the respective first signals from all of the graphics processors, with the central processing unit, transmitting a second signal to each of the graphics processors instructing each of the graphics processors to write pixel data for a respective portion of a next image to a respective second frame buffer, wherein transmitting the second signal includes modifying a value stored in a control register in each of the graphics processors from a stall value to a different value, wherein the rendering process in each of the graphics processors is paused while the stall value is stored in the control register.

2. The method of claim 1 wherein the graphics processors operate in parallel to write pixel data for a portion of a current image to respective first frame buffers while scanning out a portion of a previous image from respective second frame buffers.

3. The method of claim 1 wherein the first signal is a flip interrupt signal and the second signal is a global ready signal.

4. The method of claim 1 further comprising:
instructing each of the graphics processors to begin scanning out data for the current image from the respective first buffers.

5. A method of synchronizing pixel data generated by a plurality of graphics processor, the method comprising:
with a central processing unit, instructing each of the plurality of buffers to write pixel data to a first buffer and to scan out pixel data from a second buffer;
with the central processing unit, receiving a first signal from a graphics processor in the plurality of graphics processors;
with the central processing unit, determining whether a first signal has been received from each graphics processor in the plurality of graphics processors, and if not, then waiting until a first signal has been received from each graphics processor in the plurality of graphics processors; and
when a first signal has been received from each graphics processor in the plurality of graphics processors, then
with the central processing unit, instructing each of the plurality of buffers to write pixel data to the second buffer and to scan out pixel data from the first buffer,
wherein instructing each of the plurality of buffers to write pixel data to the second buffer and to scan out data from the first buffer includes modifying a value stored in a control register in each of the graphics processors from a stall value to a different value, wherein the rendering process in each of the graphics processors is paused while the stall value is stored in the control register.

6. The method of claim 5 further comprising:
transmitting a first stream of rendering commands to the plurality of graphics processors, the first stream of rendering commands including the instructions to each of the plurality of buffers to write pixel data to the first buffer and to scan out the pixel data from the second buffer.

7. The method of claim 6 further comprising:
transmitting a second stream of rendering commands to the plurality of graphics processors, the second stream of rendering commands including the instructions to each of the plurality of buffers to write pixel data to the second buffer and to scan out the pixel data from the first buffer.

8. The method of claim 5 further comprising:
before instructing each of the plurality of buffers to write pixel data to the second buffer and to scan out data from the first buffer, waiting for a vsync event to begin.

9. The method of claim 5 further comprising:
after a first signal has been received from each graphics processor in the plurality of graphics processors, receiving a second signal indicating that a vsync event has begun, then instructing each of the plurality of buffers to write pixel data to the second buffer and to scan out data from the first buffer.

10. The method of claim 5 wherein the first signal is a flip interrupt signal.

11. The method of claim 10 wherein each of the plurality of buffers are instructed to write pixel data to the second buffer and to scan out data from the first buffer by transmitting a global ready signal.

12. A method of synchronizing buffer transitions among a plurality of graphics processors using a central processing unit, the method comprising:
with the central processing unit, instructing each of the plurality of buffers to write pixel data to a first buffer and to scan out pixel data from a second buffer;
with the central processing unit, receiving a first signal from each of the plurality of graphics processors;
with the central processing unit, receiving a second signal indicating that a vsync event has begun; and
with the central processing unit, instructing each of the plurality of buffers to write pixel data to the second buffer and to scan out pixel data from the first buffer,
wherein instructing each of the plurality of buffers to write pixel data to the second buffer and to scan out pixel data from the first buffer includes modifying a value stored in a control register in each of the graphics processors from a stall value to a different value, wherein the rendering process in each of the graphics processors is paused while the stall value is stored in the control register.

13. The method of claim 12 wherein receiving a first signal from each of the plurality of graphics processors comprises:
receiving a first signal from a graphics processor in the plurality of graphics processors; and
determining whether a first signal has been received from each graphics processor in the plurality of graphics processors.

14. The method of claim 12 wherein the first signal is a flip interrupt signal.

15. The method of claim 14 wherein each of the plurality of buffers are instructed to write pixel data to the second buffer and to scan out data from the first buffer by transmitting a global ready signal.

16. The method of claim 12 further comprising:
transmitting a first stream of rendering commands to the plurality of graphics processors, the first stream of rendering commands including the instructions to each of the plurality of buffers to write pixel data to the first buffer and to scan out the pixel data from the second buffer.

17. The method of claim 16 further comprising:
transmitting a second stream of rendering commands to the plurality of graphics processors, the second stream of rendering commands including the instructions to each of the plurality of buffers to write pixel data to the second buffer and to scan out the pixel data from the first buffer.

* * * * *